(12) United States Patent
Cho et al.

(10) Patent No.: US 10,890,819 B2
(45) Date of Patent: Jan. 12, 2021

(54) ELECTROCHROMIC NANOPARTICLES AND METHOD FOR PRODUCING SAME

(71) Applicant: LG ELECTRONICS INC., Seoul (KR)

(72) Inventors: Sanggeun Cho, Seoul (KR); Sangmo Koo, Seoul (KR); Koun Park, Seoul (KR); Gukhwan An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 166 days.

(21) Appl. No.: 16/097,158

(22) PCT Filed: Nov. 4, 2016

(86) PCT No.: PCT/KR2016/012653
§ 371 (c)(1),
(2) Date: Oct. 26, 2018

(87) PCT Pub. No.: WO2017/188532
PCT Pub. Date: Nov. 2, 2017

(65) Prior Publication Data
US 2020/0073191 A1    Mar. 5, 2020

(30) Foreign Application Priority Data

Apr. 27, 2016    (KR) .................. 10-2016-0051773

(51) Int. Cl.
*G02F 1/153*    (2006.01)
*B82B 3/00*    (2006.01)
(Continued)

(52) U.S. Cl.
CPC .............. *G02F 1/1533* (2013.01); *B82B 3/00* (2013.01); *B82Y 30/00* (2013.01); *C09K 9/02* (2013.01);
(Continued)

(58) Field of Classification Search
CPC .......... G02F 1/153; G02F 1/15; G02F 1/1524; G02F 2201/08; G02F 2203/055;
(Continued)

(56) References Cited

U.S. PATENT DOCUMENTS 5,470,673 A    11/1995   Tseung et al.
7,270,880 B2 *   9/2007   Pichot ...................... C09K 9/02
                                                     427/375
(Continued)

FOREIGN PATENT DOCUMENTS

CN    104609705 A    5/2015
KR    10-2005-0096148 A    10/2005
(Continued)

*Primary Examiner* — Kristina M Deherrera
(74) *Attorney, Agent, or Firm* — Birch, Stewart, Kolasch & Birch, LLP

(57) ABSTRACT

The present invention relates to electrochromic nanoparticles having a core-shell structure, and a method for producing the same. In order to achieve the above or other objectives, an aspect of the present invention provides a method for producing electrochromic nanoparticles having a core-shell structure, the method comprising the steps of: preparing a core having a predetermined particle diameter; and adsorbing different types of electrochromic materials on the surface of the core, wherein the electrochromic materials have different absorption spectra. According to the present invention, it is possible to provide electrochromic nanoparticles having excellent shielding ability against visible rays and a method for producing the same.

8 Claims, 6 Drawing Sheets

(51) Int. Cl.
    *G02F 1/1524*    (2019.01)
    *B82Y 30/00*     (2011.01)
    *C09K 9/02*      (2006.01)

(52) U.S. Cl.
    CPC ........ *G02F 1/1524* (2019.01); *G02F 2201/08* (2013.01); *G02F 2202/36* (2013.01); *G02F 2203/055* (2013.01)

(58) Field of Classification Search
    CPC ........... G02F 202/36; G02F 2001/1678; G02F 1/167; G02F 1/1533; G02B 26/026; B82Y 30/00; B82Y 40/00; C09K 9/02; B82B 3/00
    USPC ........... 359/265, 290–298, 253–254; 345/45, 345/105, 107; 349/33; 430/31–32
    See application file for complete search history.

(56)    References Cited

U.S. PATENT DOCUMENTS

| | | | |
|---|---|---|---|
| 2014/0118814 A1 | 5/2014 | Uhm et al. | |
| 2014/0320782 A1 | 10/2014 | Uhm et al. | |
| 2016/0314953 A1* | 10/2016 | Addleman | G01N 1/405 |

FOREIGN PATENT DOCUMENTS

| | | |
|---|---|---|
| KR | 10-2006-0088152 A | 8/2006 |
| KR | 10-2008-0111957 A | 12/2008 |
| KR | 10-2014-0028389 A | 3/2014 |
| KR | 10-2014-0055492 A | 5/2014 |

\* cited by examiner

US 10,890,819 B2

ELECTROCHROMIC NANOPARTICLES AND METHOD FOR PRODUCING SAME

CROSS REFERENCE TO RELATED APPLICATIONS

This application is the National Phase of PCT International Application No. PCT/KR2016/012653, filed on Nov. 4, 2016, which claims priority under 35 U.S.C. 119(a) to Patent Application No. 10-2016-0051773, filed in Republic of Korea on Apr. 27, 2016, all of which are hereby expressly incorporated by reference into the present application.

TECHNICAL FIELD

The present invention relates to electrochromic nanoparticles having a core-shell structure, and a method for producing the same.

BACKGROUND ART

Electrochromism is a phenomenon in which coloration or decolorization is performed by electrochemical oxidation or reduction reaction depending on the direction of application of electric current. An electrochromic material maintains a predetermined color, and when electric current is applied, the electrochromic material will be discolored to another color. And, when the application of the electric current is stopped or the direction of the electric current is reversed, the original color of the electrochromic material is restored.

Here, the absorption spectrum of the electrochromic material is changed by oxidation or reduction reaction. That is, the electrochromic material does not emit light by itself, but takes on a color through light absorption. Electrochromic devices having these properties have been widely used for uses such as mirrors and sunroofs for vehicles, smart windows, and outdoor displays.

Meanwhile, electrochromic materials are classified into a memory type in which once the discoloration occurs, the discolored state is maintained even though no voltage is applied between an upper electrode and a lower electrode, and a non-memory type in which even though discoloration occurs, the discolored state is maintained only when voltage is continuously applied between the upper electrode and the lower electrode.

The memory type has a very high utilization value because the power consumption for the material discoloration is not high. Thus, various studies for utilizing the memory type electrochromic material have been conducted.

However, an electrochromic material in the related art has disadvantages in that it is difficult to implement various colors, and to implement high shielding properties because only one material takes part in discoloration.

DISCLOSURE OF THE INVENTION

Therefore, object of the present invention is to solve the above-described problems and other problems. Another object of the present invention is to provide electrochromic particles taking on a black-series color and a method for producing the same.

Further, still another object of the present invention is to enable a thickness of a black-series electrochromic device to be minimized.

To achieve these and other advantages and in accordance with the purpose of the present invention, as embodied and broadly described herein, there is provided a method for producing electrochromic nanoparticles having a core-shell structure, the method including the steps of: preparing a core having a predetermined particle diameter; and adsorbing different types of electrochromic materials on the surface of the core, wherein the electrochromic materials have different absorption spectra.

In an Example, the method further includes the step of coating a predetermined substrate with the core before adsorbing the electrochromic materials on the surface of the core, in which the adsorbing of the electrochromic materials may adsorb the electrochromic materials on the surface of the core coated on the predetermined substrate. Through this, bonding strength of nanoparticles to the substrate may be improved.

In an Example, the electrochromic materials may include a first electrochromic material having a maximum absorption wavelength of 450 nm to 510 nm, a second electrochromic material having a maximum absorption wavelength of 520 nm to 580 nm, and a third electrochromic material having a maximum absorption wavelength of 590 nm to 650 nm. Through this, the nanoparticles according to the present invention may have excellent shielding ability against visible rays.

In an Example, the adsorbing of the electrochromic materials may include the step of immersing the substrate coated with the core in a mixed solution of the first to third electrochromic materials. Through this, the present invention may adsorb three electrochromic materials on the surface of the core.

In an Example, the adsorbing of the electrochromic materials may include the steps of: preparing a first solution in which the first electrochromic material is dissolved, a second solution in which the second electrochromic material is dissolved, and a third solution in which the third electrochromic material is dissolved; and immersing the substrate coated with the core in the first to third solutions in a predetermined order. Through this, the present invention may sequentially adsorb different types of three electrochromic materials on the surface of the core.

In an Example, the core is characterized by being formed of any one of a first electrochromic material having a maximum absorption wavelength of 450 nm to 510 nm, a second electrochromic material having a maximum absorption wavelength of 520 nm to 580 nm, and a third electrochromic material having a maximum absorption wavelength of 590 nm to 650 nm, and when the core is formed of the electrochromic material, the adsorbing of the electrochromic materials may include the step of adsorbing the others except for the electrochromic material constituting the core in the first to third electrochromic materials on the surface of the core. Through this, the present invention may simplify a method for producing nanoparticles by reducing the number of electrochromic materials constituting a shell.

Further, the present invention provides electrochromic nanoparticles having a core-shell structure, in which the electrochromic nanoparticles include a core having a predetermined particle diameter; and a shell encompassing the core and formed of different types of electrochromic materials, and the electrochromic materials have different absorption spectra.

According to the present invention, it is possible to provide electrochromic nanoparticles having excellent shielding ability against visible rays and a method for producing the same.

Further, when the electrochromic nanoparticles according to the present invention are used, an electrochromic device taking on a black-series color may be manufactured by using only one electrochromic layer. Through this, a thickness of an electrochromic device may be reduced.

MODES FOR CARRYING OUT THE PREFERRED EMBODIMENTS

Figure 1:
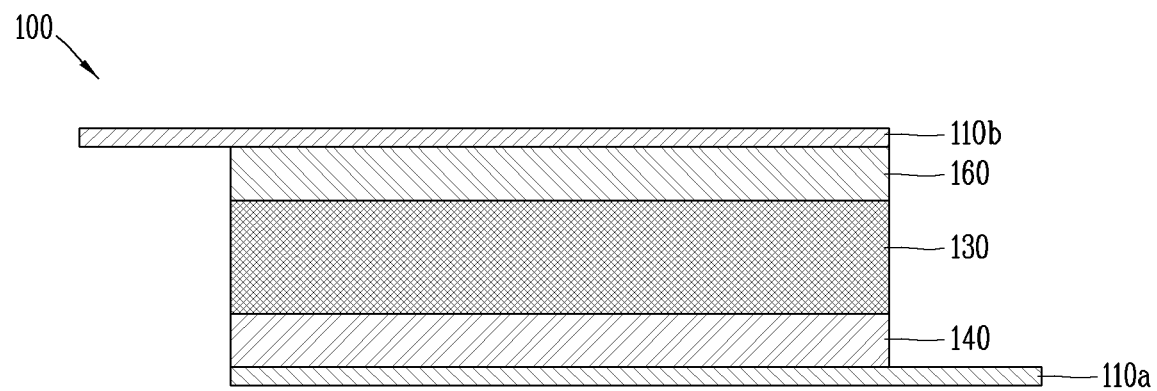
FIG. 1 is a conceptual view illustrating an electrochromic device.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

Hereinafter, Examples disclosed in the present specification will be described in detail with reference to the accompanying drawings, the same reference numerals are given to the same or similar constituent elements irrespective of the drawing signs, and the repeated description thereof will be omitted. When it is determined that the detailed description of the publicly known art related in describing the Examples disclosed in the present specification may obscure the gist of the Examples disclosed in the present specification, the detailed description thereof will be omitted. In addition, the accompanying drawings are provided to easily understand the examples disclosed in the present specification, and it is to be appreciated that the technical spirit disclosed in the present specification is not limited by the accompanying drawings, and the accompanying drawings include all the modifications, equivalents, and substitutions included in the spirit and the technical scope of the present invention.

An electrochromic structural body according to the present invention is utilized in an electrochromic device. Hereinafter, an electrochromic device will be described before describing an electrochromic structural body.

FIG. 1 is a conceptual view illustrating an electrochromic device.

An electrochromic device 100 includes an electrolyte layer 130, an electrochromic layer 140, and an ion storage layer 160 between a first transparent electrode 110a and a second transparent electrode 110b facing the first transparent electrode 110a. Hereinafter, a transparent electrode and constituent elements included between the two transparent electrodes will be described in detail with reference to FIG. 1. Meanwhile, the electrochromic device may not include some of the above-described constituent elements, or may further include other constituent elements.

The first and second transparent electrodes 110a and 110b are electrodes having optical transparency and conductivity. The transparent electrode may be formed on a substrate formed of glass or a light-transmitting film, and may be a thin film formed of tin oxide, indium oxide, platinum, and gold, or a thin film formed of a conductive polymer.

The transparent electrode is used to apply voltage to an electrochromic material, and a power supply device is connected to one end of the transparent electrode. The power supply device generates a potential difference between two transparent electrodes facing each other.

In the electrochromic device, the first and second transparent electrodes have a predetermined area, and at least a part of an upper surface of the first transparent electrode 110a and at least a part of a lower surface of the second transparent electrode 110b face each other.

The transparent electrode transfers electric charge to an electrochromic material positioned between the transparent electrodes, so that the electrochromic material is oxidized or reduced.

When voltage is applied between the first and second transparent electrodes, the electrolyte layer 130 transfers the electric charge between the two electrodes to the electrochromic layer 140, and may be formed of a liquid-phase, quasi solid-phase, or solid-phase electrolyte.

Meanwhile, the electrolyte layer 130 may be positioned between the first bus electrode 120 and the second transparent electrode 110b. Here, the electrolyte layer 130 does not come in contact with the first bus electrode 120, and the electrochromic layer 140 may be formed in a space formed between the electrolyte layer 130 and the first bus electrode 120.

Further, the electrolyte layer 130 may or may not come in contact with the second transparent electrode 110b. When the electrolyte layer 130 does not come in contact with the second transparent electrode 110b, another layer may be positioned between the electrolyte layer 130 and the second transparent electrode 110b. This will be described below.

The electrochromic layer 140 may be formed of an electrochromic material. The electrochromic layer 140 may be formed of an electrochromic material structural body according to the present invention. The electrochromic material constituting the first electrochromic layer 140 is not limited to a specific material, and may be any material which is oxidized or reduced between the first and second transparent electrodes and may be discolored.

The electrochromic layer 140 is positioned between the first transparent electrode 110a and the electrolyte layer 130, and comes in contact with the electrolyte layer 130. The electrolyte layer 130 allows the electrochromic material included in the electrochromic layer 140 to be oxidized or reduced by transferring electric charge to the electrochromic layer 140.

The ion storage layer 160 serves to strengthen the charge transferring power of the electrochromic device, and may be formed of a highly ion conductive inorganic material such as antimony-doped tin oxide. The ion storage layer 160 may be positioned between the second transparent electrode 110b and the electrolyte layer 130, and may come in contact with the second transparent electrode 110b and the electrolyte layer 130. As described above, the electrochromic device induces charge transfer to the electrochromic layer and oxidizes or reduces the electrochromic material included in the electrochromic layer. In this case, electric charge is transferred through electrons. Accordingly, the electron transfer rate in the electrochromic layer and the electrochromic rate of the electrochromic device are greatly affected.

An electrochromic device in the related art includes a plurality of electrochromic layers in order to implement a black color. Specifically, the electrochromic device in the related art includes at least three electrochromic layers, and each of the three electrochromic layers may be discolored to three primary colors (cyan, magenta, and yellow).

Since the above-described electrochromic device includes a plurality of electrochromic layers, there are disadvantages in that the thickness thereof essentially becomes large, and the transmittance is low even when the electrochromic device does not take on a black color.

In order to solve the above-described problems, the present invention provides electrochromic nanoparticles in which the particles themselves take on a black-series color, and a method for producing the same. In the electrochromic nanoparticles according to the present invention, one particle includes a plurality of electrochromic materials.

The electrochromic materials described in the present invention are discolored by any one of oxidation and reduction reactions. Here, discoloration means that the absorption spectrum of the material is changed, and the color of the material is changed from a first color to a second color. In the present specification, for the convenience of description, a state in which the absorbance is relatively low in the states before and after discoloration of the electrochromic material is expressed as a bleached state, and a state in which the absorbance is relatively high in the states before and after discoloration of the electrochromic material is expressed as a colored state. However, the above-described expression does not specify or limit the color of the electrochromic material.

In addition, the maximum absorption wavelength, absorption spectrum, and color of the electrochromic material to be described below mean the maximum absorption wavelength, absorption spectrum, and color in the colored state, respectively unless otherwise mentioned.

Hereinafter, electrochromic nanoparticles according to an Example of the present invention and a method for producing the same will be described with reference to the accompanying drawings.

Figure 2:
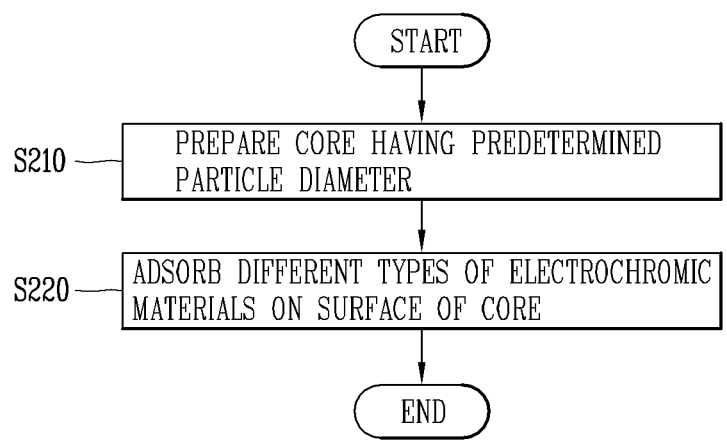
FIG. 2 is a flowchart illustrating a method for producing electrochromic nanoparticles according to the present invention.
Figure 3:
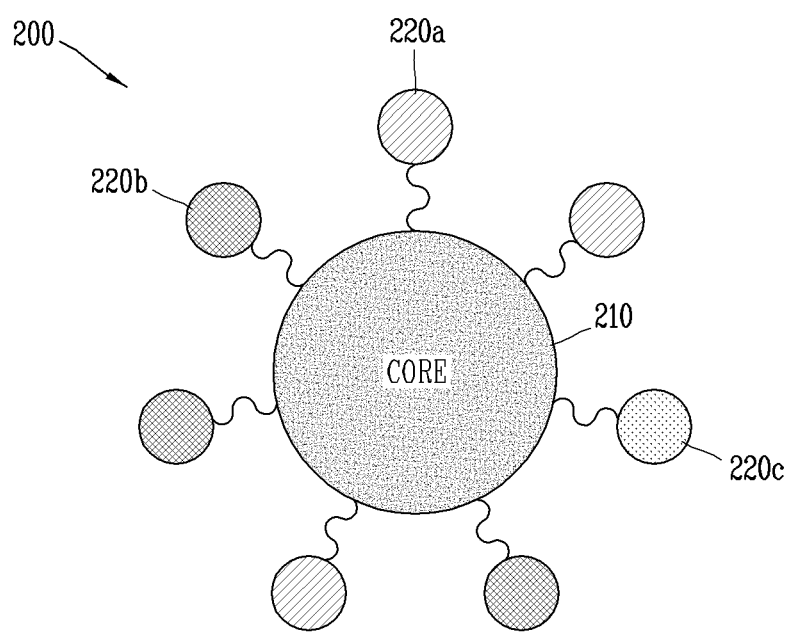
FIG. 3 is a conceptual view illustrating a structure of an electrochromic nanoparticle according to the present invention.

FIG. 2 is a flowchart illustrating a method for producing electrochromic nanoparticles according to the present invention, and FIG. 3 is a conceptual view illustrating a structure of an electrochromic nanoparticle according to the present invention.

As illustrated in FIG. 3, the nanoparticle according to the present invention has a core-shell structure. The electrochromic nanoparticle 200 according to the present invention may be converted from one of a first state and a second state having an absorption spectrum different from that of the first state to the other state, and takes on a black-series color when the electrochromic nanoparticle 200 according to the present invention is in any one of the first and second states.

In order to produce the nanoparticles having the core-shell structure, in the present invention, a step S210 of preparing a core having a predetermined particle diameter is performed in the present invention.

The preparing of the core 210 may use the already publicly known method for producing nanoparticles.

The core 210 may be formed of an inorganic material or a conductive inorganic material. For example, the core 210 may be formed of any one of $TiO_2$ and ATO, which are inorganic materials, or may be formed of any one of indium-doped tin oxide, Al-doped zinc oxide, and ZnO, which are conductive inorganic materials.

The core 210 serves to adsorb different types of electrochromic materials on the surface thereof, and may be formed in a bulk state or in a monodispersed form. Meanwhile, the core 210 may be formed of an electrochromic material, but this will be described below.

Next, in the present invention, a step S220 of adsorbing different types of electrochromic materials on the surface of the core is performed.

Figure 4:
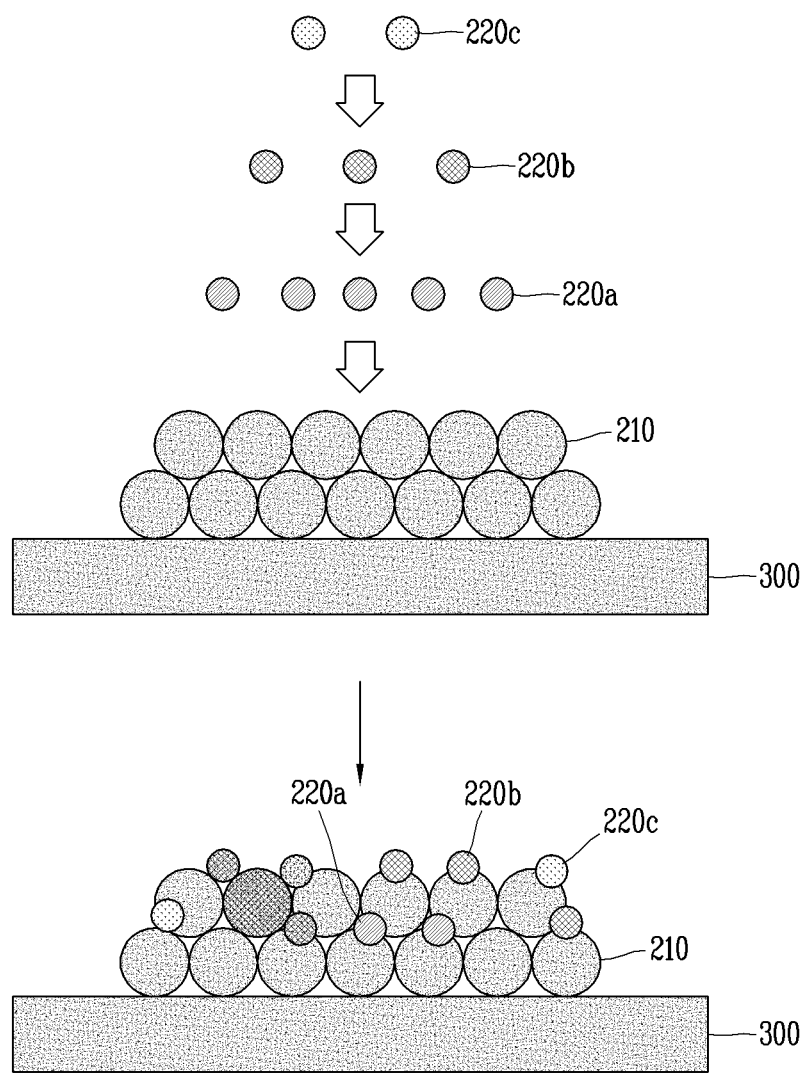
FIG. 4 is a conceptual view illustrating a method for producing the electrochromic nanoparticles according to the present invention.

FIG. 4 is a conceptual view illustrating a method for producing electrochromic nanoparticles according to the present invention.

The electrochromic nanoparticles according to the present invention are coated on one surface of a transparent electrode, and then discolored by being supplied with electric charge from the transparent electrode. That is, the nanoparticles of the present invention are coated on a predetermined substrate and utilized as an electrochromic device.

When electrochromic materials are adsorbed on the surface of the core 210, the bonding strength of the nanoparticles to the transparent electrode may be reduced. The present invention may include the step of coating the core to a predetermined thickness on a predetermined structure before adsorbing the electrochromic materials on the surface of the core 210, in order to increase the bonding strength of the nanoparticles to the transparent electrode.

For example, as in FIG. 4, the core 210 particles may be coated on a predetermined substrate 300 before electrochromic materials are adsorbed on the surface thereof. Thereafter, different types of electrochromic materials 220a to 220c may be coated on the surfaces of the core 210 particles coated on the substrate 300. The electrochromic materials 220a to 220c may be adsorbed on the particle surface of the core 210 at once or adsorbed sequentially on the surface of the core 210 depending on the type of the electrochromic material. This will be described below.

Meanwhile, the core 210 particles may be coated to a thickness of 1 μm to 10 μm on the predetermined substrate. Preferably, the coating may have a thickness of 5 μm or more.

Meanwhile, the core 210 particles may be coated on one surface of a transparent electrode, the transparent electrode may be a thin film formed of tin oxide, indium oxide, platinum, and gold or a thin film formed of a conductive polymer, and the transparent electrode may be formed on a glass substrate and a polymer substrate.

Meanwhile, the nanoparticles need to evenly absorb light within a wavelength range of visible rays in order to take on a black-series color.

For this purpose, the present invention adsorbs different types of electrochromic materials 220a to 220c on the surface of the core. Specifically, the electrochromic materials may include a first electrochromic material having a maximum absorption wavelength of 450 nm to 510 nm, a second electrochromic material having a maximum absorption wavelength of 520 nm to 580 nm, and a third electrochromic material having a maximum absorption wavelength of 590 nm to 650 nm.

For example, the first to third electrochromic materials may be compounds represented by the following Chemical Formulae 1 to 3.

$C_{28}H_{15}N_2O_{10}$ [Chemical Formula 1]

$C_{28}H_{24}Cl_2N_2O_6P_2$ [Chemical Formula 2]

$C_{24}H_{24}Cl_2N_2O_6P_2$ [Chemical Formula 3]

Hereinafter, for the convenience of the description, the first electrochromic material is represented by X, the second electrochromic material is represented by Y, and the third electrochromic material is represented by Z, but the above expression does not specify or limit the colors of the electrochromic materials.

Meanwhile, it is preferred that the electrochromic materials are adsorbed on the surface of the core at the same ratio. For example, when X, Y, and Z are adsorbed on the surface of the core, it is preferred that the molar ratio of the electrochromic substance adsorbed on the surface of the core is 1:1:1.

Meanwhile, when the core particles are immersed in an electrochromic material solution, the electrochromic materials are adsorbed on the surface of the core. The bonding rate of the electrochromic material to the core is different depending on the type thereof. Accordingly, when the core particles are immersed in a mixed solution in which the electrochromic materials are mixed at a predetermined molar ratio, the molar ratio of the electrochromic materials bonded to the surface of the core varies.

For example, when the core particles are immersed in a mixed solution in which X, Y, and Z are mixed at a molar ratio of 1:1:1, X, Y, and Z are not bonded to the surface of the core at a ratio of 1:1:1.

In order to solve the above-described problems, the present invention largely uses two adsorption methods.

First, the present invention adsorbs electrochromic materials on the surface of the core by using a mixed solution in which the electrochromic materials are mixed at different ratios.

Specifically, in the present invention, when the mixed solution is prepared, the mixing ratio varies depending on the bonding rate of the electrochromic material to the surface of the core.

For example, for the bonding strength to the core 210, X may be the smallest and Y may be the largest among X, Y, and Z. In this case, a mixed solution may be prepared such that the ratio of X is the largest and the ratio of Y is the smallest.

For example, in the mixed solution, a molar ratio of Y to X may be 0.2 to 0.5, and a molar ratio of Z to X may be 0.5 to 0.8. Preferably, a molar ratio of X, Y, and Z included in the mixed solution may be 1:0.2:0.8.

Second, the present invention separately prepares a solution for each electrochromic material, and sequentially immerses core particles in different electrochromic material solutions.

For example, after a solution for each of X, Y, and Z is prepared, the core particles are sequentially immersed in the prepared solution. In this case, the immersion order may vary. Specifically, the core particles may be immersed in an order of X→Y→Z, Y→X→Z, and Z→X→Y.

In this case, depending on the bonding strength of the electrochromic material to the surface of the core, the immersion time may vary.

It is possible to coat different electrochromic materials on the surface of the core particle by using the above-described two methods. Through this, an electrochromic device taking on a black-series color may be manufactured.

Hereinafter, electrochromic nanoparticles of which the core 210 is formed of an electrochromic material and a method for producing the same will be described.

The core 210 may be formed of an electrochromic material, and the electrochromic material constituting the core 210 may be any one of $WO_3$, NiO, MoO, $V_2O_5$, $Ta_2O_5$, $Nb_2O_5$, and CoO.

For example, the electrochromic material constituting the core 210 may formed of any one of a first electrochromic material having a maximum absorption wavelength of 450 nm to 510 nm, a second electrochromic material having a maximum absorption wavelength of 520 nm to 580 nm, and a third electrochromic material having a maximum absorption wavelength of 590 nm to 650 nm.

When the core 210 is formed of an electrochromic material, except for an electrochromic material constituting the core 210 in the first to third electrochromic materials, the others are may adsorbed on the surface of the core 210. That is, in the nanoparticles according to an Example of the present invention, electrochromic materials constituting the core 210 and the shell may take on a black color by absorbing external light.

When the core 210 is formed of an electrochromic material, the number of the electrochromic materials constituting the shell may be reduced, so that the method for producing nanoparticles may be simplified.

Hereinafter, the present invention will be described in more detail through the Examples and the Experimental Examples. However, the scope and content of the present invention are not interpreted to be curtailed or limited by the Examples and the Experimental Examples to be described below.

EXAMPLE 1

Production of Nanoparticles After Preparing Mixed Solution by Varying Mixing Ratio of XYZ A transparent electrode formed of ITO was coated on an organic substrate, and core particles formed of $TiO_2$ were coated on the coated transparent electrode. Three substrates coated with the core particles were prepared in the manner described above.

The compound (hereinafter, referred to as X) represented by Chemical Formula 1, the compound (hereinafter, referred to as Y) represented by Chemical Formula 2, and the compound (hereinafter, referred to as Z) represented by Chemical Formula 3 were dissolved in ethanol, such that the total molar concentration was 0.5 mM. In this case, three different mixed solutions were prepared by setting the molar ratio of X, Y, and Z to 1:0:1, 1:0.2:0.8, and 1:0.5:0.5.

A substrate coated with core particles was immersed in each of the three mixed solutions under room temperature and atmospheric pressure conditions for 6 hours.

After electrochromic devices were manufactured by using the three substrates, the absorption spectra of the electrochromic devices were measured.

Figure 5:
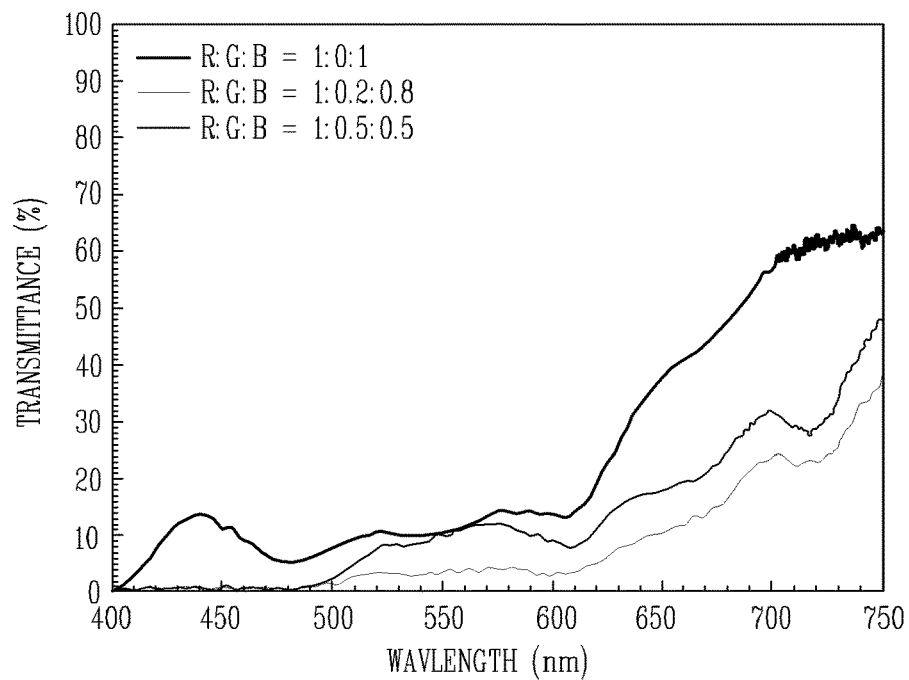
FIG. 5 is a graph illustrating the results of measuring the absorption spectra of an electrochromic device manufactured by using the electrochromic nanoparticles according to the present invention.

The absorption spectrum measurement results are the same as those in FIG. 5. As in FIG. 5, when the substrate was immersed in a mixed solution at a ratio of X:Y:Z of 1:0.2:0.8, the translucency of the electrochromic device was the lowest.

Figure 6:
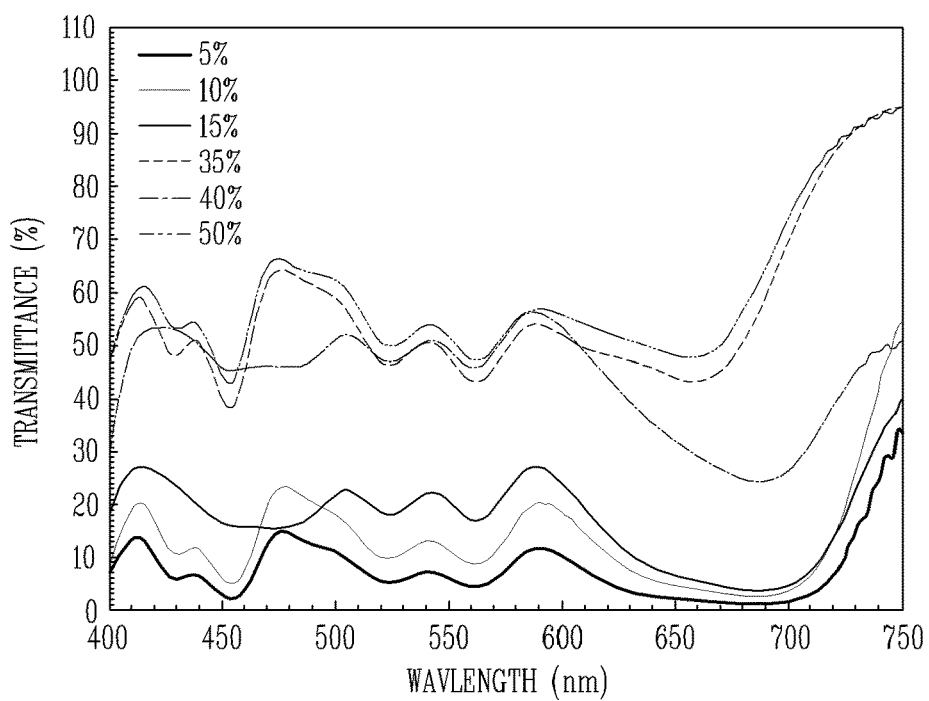
FIG. 6 is a graph illustrating the results of measuring the absorption spectra of a fixed type transmittance film at each transmittance.

Meanwhile, FIG. 6 is a graph illustrating the results of measuring the absorption spectra of a fixed type transmittance film at each transmittance.

Comparing FIG. 5 with FIG. 6, the shielding ability of the electrochromic device in which the substrate is immersed in a mixed solution at a ratio of X:Y:Z of 1:0.2:0.8 is similar to that of a fixed type transmittance film having a transmittance of 10%.

EXAMPLE 2

Production of Nanoparticles by Sequentially Adsorbing XYZ

A transparent electrode formed of ITO was coated on an organic substrate, and core particles formed of $TiO_2$ were coated on the coated transparent electrode. Three substrates coated with the core particles were prepared in the manner described above.

An X solution, a Y solution and a Z solution at a molar concentration of 0.5 mM were prepared by using ethanol as a solvent.

Substrates coated with core particles were sequentially immersed in the X solution, the Y solution, and the Z solution under room temperature and atmospheric pressure conditions for 2 hours. The immersion order for each of the three substrates was X→Y→Z, Y→X→Z, and Z→X→Y.

After electrochromic devices were manufactured by using the three substrates, the absorption spectra of the electrochromic devices were measured.

Figure 7A:
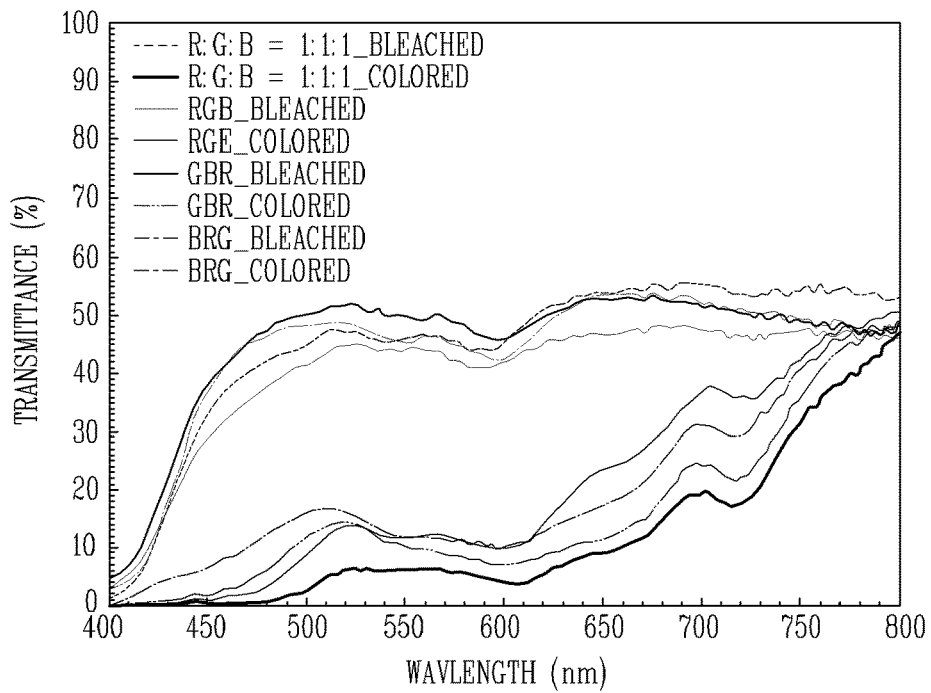
FIGS. 7A and 7B are graphs illustrating the results of measuring the absorption spectra of an electrochromic device manufactured by using the electrochromic nanoparticles according to the present invention.
Figure 7B:
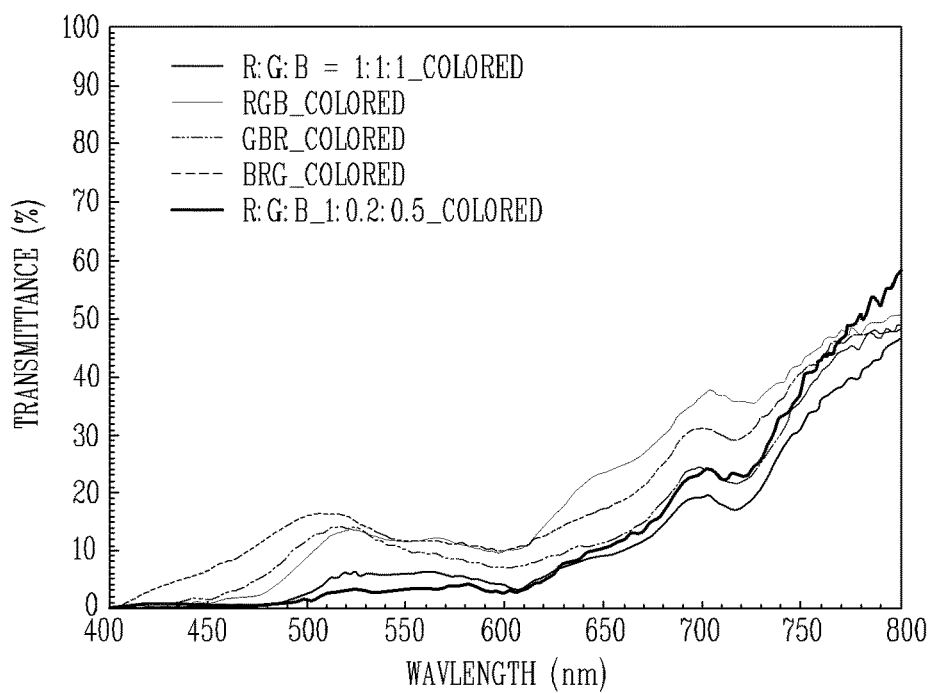
Figure 8:
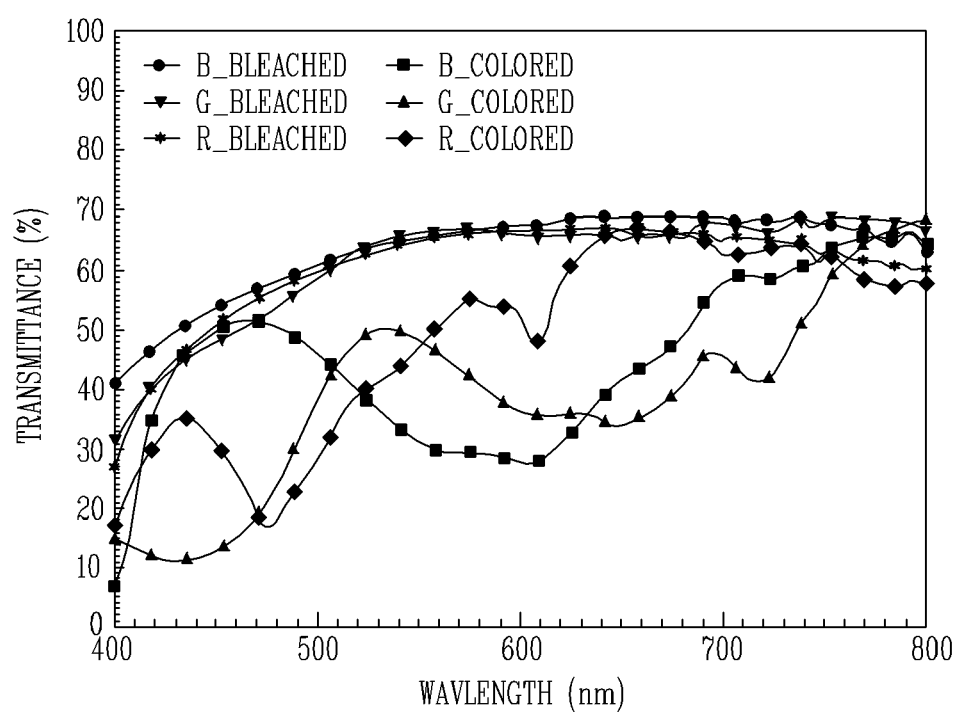
FIG. 8 is a graph illustrating the results of measuring the absorption spectra of electrochromic materials constituting a shell of the electrochromic nanoparticle according to the present invention.

The absorption spectrum measurement results are the same as those in FIGS. 7A and 7B. FIGS. 7A and 7B also illustrate the absorption spectrum of the electrochromic device manufactured in Example 1.

Among the electrochromic devices manufactured in Example 2, the electrochromic device having the substrate immersed in the order of Y→X→Z had the best shielding ability. Meanwhile, when all the electrochromic devices manufactured in Examples 1 and 2 were compared, the shielding ability of the electrochromic device (X:Y:Z=1:0.2:0.8) manufactured in Example 1 was the best.

EXPERIMENTAL EXAMPLE 1

Measurement of Absorption Spectrum of Electrochromic Material

The transmittances for the bleached state and the colored state of X, Y, and Z were measured. In this case, light sources having different emission spectra were used, and the used light sources had a center emission wavelength of 480 nm, 550 nm, and 620 nm.

The transmittance measurement results for each of X, Y and Z is the same as those in the following Table 1.

Z had excellent shielding ability against light emitted from light sources having a center emission wavelength of 550 nm and 620 nm, Y had excellent shielding ability against light emitted from light sources having a center emission wavelength of 480 nm and 620 nm, and X had excellent shielding ability against light emitted from a light source having a center emission wavelength of 480 nm.

Nanoparticles with X, Y and Z adsorbed on the surface are expected to have excellent shielding ability against visible rays.

TABLE 1

| Center wavelength (nm) | Material | Transmittance (%) Bleached state | Colored state | Transmittance variation amount |
|---|---|---|---|---|
| 480 | Z | 50.3 | 58.1 | 7.8 |
| | Y | 24.0 | 53.7 | 29.7 |
| | X | 18.1 | 56.4 | 38.3 |
| | Z | 31.0 | 65.6 | 34.6 |
| | Y | 48.3 | 65.8 | 17.5 |
| | X | 47.6 | 64.7 | 17.1 |
| | Z | 31.1 | 68.4 | 37.3 |
| | Y | 35.8 | 66.0 | 30.2 |
| | X | 58.0 | 66.5 | 8.5 |

It is obvious to the person skilled in the art that the present invention can be embodied in other specific forms without departing from the spirit and essential characteristics of the present invention.

Further, the aforementioned detailed description should not be interpreted as limitative in all aspects, and should be considered as illustrative. The scope of the present invention should be defined by the reasonable interpretation of the accompanying claims, and all the modifications within the equivalent scope of the present invention are included in the scope of the present invention.

The invention claimed is:

1. A method for producing electrochromic nanoparticles having a core-shell structure, the method comprising:
    preparing a core;
    coating a glass or polymer substrate provided with a transparent electrode with the core; and
    adsorbing different types of electrochromic materials on a surface of the core coated on the substrate,
    wherein the electrochromic materials have different absorption spectra,
    wherein the electrochromic materials comprise a first electrochromic material having a maximum absorption wavelength of 450 nm to 510 nm, a second electrochromic material having a maximum absorption wavelength of 520 nm to 580 nm, and a third electrochromic material having a maximum absorption wavelength of 590 nm to 650 nm, and
    wherein the adsorbing of the electrochromic materials comprises immersing the substrate coated with the core in a mixed solution of the first to third electrochromic materials.

2. The method of claim 1, wherein in the mixed solution, a molar ratio of the second electrochromic material to the first electrochromic material is 0.2 to 0.5, and a molar ratio of the third electrochromic material to the first electrochromic material is 0.5 to 0.8.

3. The method of claim 1, wherein the adsorbing of the electrochromic materials comprises:
    preparing a first solution in which the first electrochromic material is dissolved, a second solution in which the second electrochromic material is dissolved, and a third solution in which the third electrochromic material is dissolved; and
    immersing the substrate coated with the core in the first to third solutions in an order.

4. The method of claim 1, wherein the first to third electrochromic materials are compounds represented by the following Chemical Formulae 1 to 3:

$C_{28}H_{15}N_2O_{10}$           [Chemical Formula 1]

$C_{24}H_{24}Cl_2N_2O_6P_2$  [Chemical Formula 2]

$C_{14}H_{20}Cl_2N_2O_6P_2$  [Chemical Formula 3]

5. The method of claim 1, wherein the core is formed of any one of the first electrochromic material having the maximum absorption wavelength of 450 nm to 510 nm, the second electrochromic material having the maximum absorption wavelength of 520 nm to 580 nm, and the third electrochromic material having the maximum absorption wavelength of 590 nm to 650 nm, and when the core is formed of the electrochromic material, the adsorbing of the electrochromic materials comprises adsorbing the others except for the electrochromic material constituting the core in the first to third electrochromic materials on the surface of the core.

6. The method of claim 5, wherein the core is formed of any one of $WO_3$, NiO, MoO, $V_2O_5$, $Ta_2O_5$, $Nb_2O_5$, and CoO.

7. Electrochromic nanoparticles having a core-shell structure, wherein the electrochromic nanoparticles comprise a core formed of an electrochromic material and a shell encompassing the core and formed of different types of electrochromic materials, and the electrochromic materials have different absorption spectra, wherein the core is formed of any one of a first electrochromic material having a maximum absorption wavelength of 450 nm to 510 nm, a second electrochromic material having a maximum absorption wavelength of 520 nm to 580 nm, and a third electrochromic material having a maximum absorption wavelength of 590 nm to 650 nm, and wherein the shell is formed of others except for the electrochromic material constituting the core in the first to third electrochromic materials.

8. The electrochromic nanoparticles of claim 7, wherein the electrochromic nanoparticles are converted from one of a first state and a second state having an absorption spectrum different from the first state to another state, and take on a black-series color in any one of the first and second states.

* * * * *